United States Patent
Matsuda et al.

[11] Patent Number: 6,144,352
[45] Date of Patent: Nov. 7, 2000

[54] LED DISPLAY DEVICE AND METHOD FOR CONTROLLING THE SAME

[75] Inventors: Yoshikazu Matsuda, Kagoshima; Kazuya Yamaguchi, Hioki-gun, both of Japan

[73] Assignee: Matsushita Electric Industrial Co., Ltd., Osaka, Japan

[21] Appl. No.: 09/080,012

[22] Filed: May 15, 1998

[30] Foreign Application Priority Data

May 15, 1997 [JP] Japan ................................ 9-125319

[51] Int. Cl.[7] ........................................... G09G 3/32
[52] U.S. Cl. .......................... 345/83; 345/150; 345/152; 345/153; 345/154
[58] Field of Search .................... 345/154, 150, 345/152, 153, 167, 82, 83

[56] References Cited

U.S. PATENT DOCUMENTS

| | | | |
|---|---|---|---|
| 4,488,245 | 12/1984 | Dalke et al. | 364/526 |
| 5,008,788 | 4/1991 | Palinkas | 362/231 |
| 5,426,445 | 6/1995 | Takei et al. | 345/82 |
| 5,555,107 | 9/1996 | Funada et al. | 358/518 |
| 5,656,935 | 8/1997 | Havel | 324/115 |
| 5,812,105 | 9/1998 | Van De Ven | 345/83 |
| 5,836,676 | 11/1998 | Ando et al. | 362/244 |

FOREIGN PATENT DOCUMENTS

| | | |
|---|---|---|
| 0 367 848 | 5/1990 | European Pat. Off. . |
| 7-226536 | 8/1995 | Japan . |
| 8-272316 | 2/1997 | Japan . |
| 9-98443 | 4/1997 | Japan . |
| 2 205 431 | 12/1988 | United Kingdom . |
| 2 282 928 | 4/1995 | United Kingdom . |
| WO 88/07249 | 9/1988 | WIPO . |

*Primary Examiner*—William A. Cuchlinski, Jr.
*Assistant Examiner*—Marthe Y. Marc-Coleman
*Attorney, Agent, or Firm*—Ratner & Prestia

[57] ABSTRACT

An LED display device includes an LED display section including a plurality of light emitting blocks arranged in a matrix, each light emitting block including at least a red LED, a green LED, and a blue LED; a color control section including a red color control circuit, a green color control circuit and a blue color control circuit, for controlling an amount of light emitted by the red LED, the green LED, and the blue LED in accordance with a red color signal, a green color signal and a blue color signal; and an LED driving control section including a red LED driving circuit, a green LED driving circuit and a blue LED driving circuit, for controlling the LED display section in response to an output signal from the color control section. At least one of a control of controlling the red LED driving circuit and the green LED driving circuit in response to an output signal from the red color control circuit and a control of controlling the green LED driving circuit and the red LED driving circuit in response to an output signal from the green color control circuit is performed.

13 Claims, 4 Drawing Sheets

LED DISPLAY DEVICE AND METHOD FOR CONTROLLING THE SAME

BACKGROUND OF THE INVENTION

1. Field of the Invention

The present invention relates to a light emitting diode (hereinafter, referred to as an "LED") display device including a plurality of light emitting blocks or dots arranged in a matrix, each light emitting block having LEDs for three or more colors, and a method for controlling such an LED display device.

2. Description of the Related Art

In color video display devices, color display is obtained by color mixing of red primary color, green primary color and blue primary color. Conventionally, a color TV signal is mainly used for a video signal for color video display. In an LED display device including a red LED, a green LED and a blue LED, only a red LED is turned on in accordance with a red color signal, only a green RED is turned on in accordance with a green color signal, and only a blue RED is turned on in accordance with a blue color signal.

Table 1 shows chromaticity values of red, green and blue colors obtained by exemplary standards for color TV broadcasting.

TABLE 1

| Primary color | NTSC standards (SMPTE 170M) | | HDTV studio standards (CCIR Rec709) | |
|---|---|---|---|---|
| | x | y | x | y |
| Red | 0.630 | 0.340 | 0.640 | 0.330 |
| Green | 0.310 | 0.595 | 0.300 | 0.600 |
| Blue | 0.155 | 0.070 | 0.150 | 0.060 |

As shown in Table 1, the x values of the red color for the NTSC standards (SMPTE 170M) and the HDTV standards are substantially equal to each other, and the y values of the red color for the NTSC standards and the HDTV standards are substantially equal to each other. The x values and the y values of each of the green and blue colors for the NTSC standards (SMPTE 170M) and the HDTV standards are also equal to each other. CRTs (cathode ray tubes) used in current color TVs have substantially equal values to those shown in Table 1. Thus, the video reproducibility obtained by the CRTs is satisfactorily high.

Table 2 shows chromaticity values of red, green and blue colors obtained by LEDs which are currently in practical use.

TABLE 2

| Color | Chromaticity | |
|---|---|---|
| | x | y |
| Red | 0.72 | 0.28 |
| Green | 0.17 | 0.70 |
| Blue | 0.13 | 0.075 |

The chromaticity values of the blue color in Tables 1 and 2 are proximate to each other, but the chromaticity values of each of the red and green colors in Tables 1 and 2 are different from each other.

Figure 5:
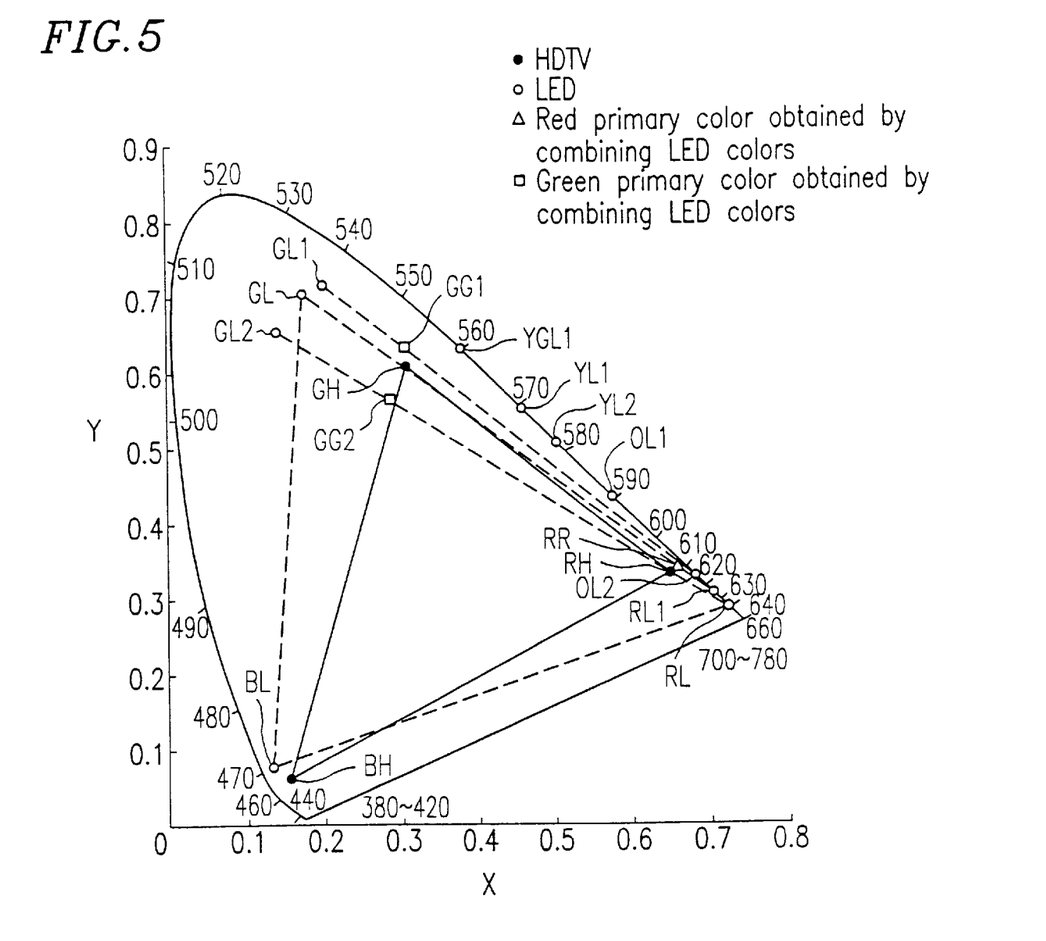
FIG. 5 is a chromaticity diagram illustrating chromaticity values of colors reproducible by HDTV and LED.

This is confirmed from the chromaticity diagram in FIG. 5, in which the chromaticity values of the blue color for HDTV and LED are substantially equal to each other, but the chromaticity values of each of the red and green colors for HDTV and LED are different from each other.

As can be appreciated from this, the conventional method for operating an LED display device including the steps of turning on only the red LED in accordance with the red color signal, turning on only the green LED in accordance with the green color signal, and turning on only the blue LED in accordance with the blue color signal causes inferior color reproducibility for red and green, thus resulting in unnatural color display.

Japanese Laid-Open Publication No. 8-272316, for example, proposes simultaneously turning on two green LEDs for emitting light components having different wavelengths in order to compensate for the inferiority of the green color. Such a system disadvantageously requires four LEDs and four LED driving circuits.

SUMMARY OF THE INVENTION

According to the present invention, red primary color light is emitted by turning on a red LED as a main LED and also turning on, as a sub-LED, another LED providing a different chromaticity value from that of the red LED. Green primary color light is emitted by turning on a green LED as a main LED and also turning on, as a sub-LED, another LED providing a different chromaticity value from that of the green LED. In this manner, natural color display having a satisfactory color reproducibility is provided.

The red primary color light can be emitted by a combination of a red LED, and a yellow, orange or yellow-green LED in lieu of the green LED.

The green primary color light can be emitted by a combination of a green LED, and an orange, yellow or yellow-green LED in lieu of the red LED.

The red primary color or the green primary color can be emitted by combining three or more LEDs including the LED used as the main LED, the LED used as the sub LED, and another LED providing a different chromaticity value.

According to one aspect of the invention, an LED display device includes an LED display section including a plurality of light emitting blocks arranged in a matrix, each light emitting block including at least a red LED, a green LED, and a blue LED; a color control section including a red color control circuit, a green color control circuit and a blue color control circuit, for controlling an amount of light emitted by the red LED, the green LED, and the blue LED in accordance with a red color signal, a green color signal and a blue color signal; and an LED driving control section including a red LED driving circuit, a green LED driving circuit and a blue LED driving circuit, for controlling the LED display section in response to an output signal from the color control section. At least one of a control of controlling the red LED driving circuit and the green LED driving circuit in response to an output signal from the red color control circuit and a control of controlling the green LED driving circuit and the red LED driving circuit in response to an output signal from the green color control circuit is performed.

Due to such a structure, the red and green colors provided by the red and green LEDs of the LED display device are respectively compensated for by the green and red colors provided by the green and red LEDs. Accordingly, the red and green colors sent by the TV broadcasting system are reproduced at a satisfactory fidelity.

According to another aspect of the invention, an LED display device includes an LED display section including a plurality of light emitting blocks arranged in a matrix, each light emitting block including at least a red LED, a green LED, and a blue LED; a red color control circuit, a green color control circuit, a blue color control circuit for controlling amounts of light emitted by the red LED, the green LED, and the blue LED in accordance with a red color signal, a green color signal, and a blue color signal; and a red LED driving circuit, a green LED driving circuit, and a blue LED driving circuit in response to output signals from the red color control circuit, the green color control circuit, and the blue color control circuit. At least one of a control of controlling the red LED driving circuit and the green LED driving circuit in response to an output signal from the red color control circuit and a control of controlling the green LED driving circuit and the red LED driving circuit in response to an output signal from the green color control circuit is performed. At least one of an orange LED, a yellow LED and a yellow-green LED is controlled.

Due to such a structure, the red and green colors provided by the red and green LEDs of the LED display device are respectively compensated for by the green and red colors provided by the green and red LEDs. Accordingly, the red and green colors sent by the TV broadcasting system are reproduced at a satisfactory fidelity.

In one embodiment of the invention, the color control section includes at least one chromaticity adjusting element for adjusting chromaticity coordinates of a color signal to be sent to the LED driving control section. Accordingly, the color to be provided by the LED display device can be adjusted so as to match the chromaticity coordinates of the primary color from the transmitter (e.g., TV broadcasting system) and the vicinity of the chromaticity coordinates of the primary color.

In one embodiment of the invention, the red color control circuit and the green color control circuit respectively include amplification elements for amplifying color signals to be sent to the LED driving control section at different ratios and also include a signal division element for supplying the amplified signals to the LED driving control section. Accordingly, the red, green and blue colors obtained by the LED display device are very close to the red, green and blue primary colors provided by the TV broadcasting system.

According to still another aspect of the invention, a method for controlling an LED display device including a light emitting block having at least a red LED, a green LED and a blue LED is provided. The method includes the step of turning on the red LED and at least one of the other LEDs having a different chromaticity value to adjust the chromaticity value of the red LED.

Due to such a method, the red color provided by the LED display device is adjusted to have chromaticity values of the red primary color provided by the transmitter.

In one embodiment of the invention, the at least one of the other LEDs is the green LED. Accordingly, the red color provided by the LED display device is adjusted to have chromaticity values proximate to those of the red primary color provided by the transmitter.

In one embodiment of the invention, the at least one of the other LEDs is at least one selected from the group consisting of an orange LED, a yellow LED and a yellow-green LED. Accordingly, the red color provided by the LED display device is adjusted to have chromaticity values proximate to those of the red primary color provided by the transmitter.

According to still another aspect of the invention, a method for controlling an LED display device including a light emitting block having at least a red LED, a green LED and a blue LED is provided. The method includes the step of turning on the green LED and at least one of the other LEDs having a different chromaticity value to adjust the chromaticity value of the green LED.

Due to such a method, the green color provided by the LED display device is adjusted to have chromaticity values of the green primary color provided by the transmitter.

In one embodiment of the invention, the at least one of the other LEDs is the red LED. Accordingly, the green color provided by the LED display device is adjusted to have chromaticity values proximate to those of the green primary color provided by the transmitter.

In one embodiment of the invention, the at least one of the other LEDs is at least one selected from the group consisting of an orange LED, a yellow LED and a yellow-green LED. Accordingly, the green color provided by the LED display device is adjusted to have chromaticity values proximate to those of the green primary color provided by the transmitter.

Thus, the invention described herein makes possible the advantages of providing an LED display device offering satisfactory reproducibility of red and green colors and thus realizing natural color display, and a method for controlling such an LED display device.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
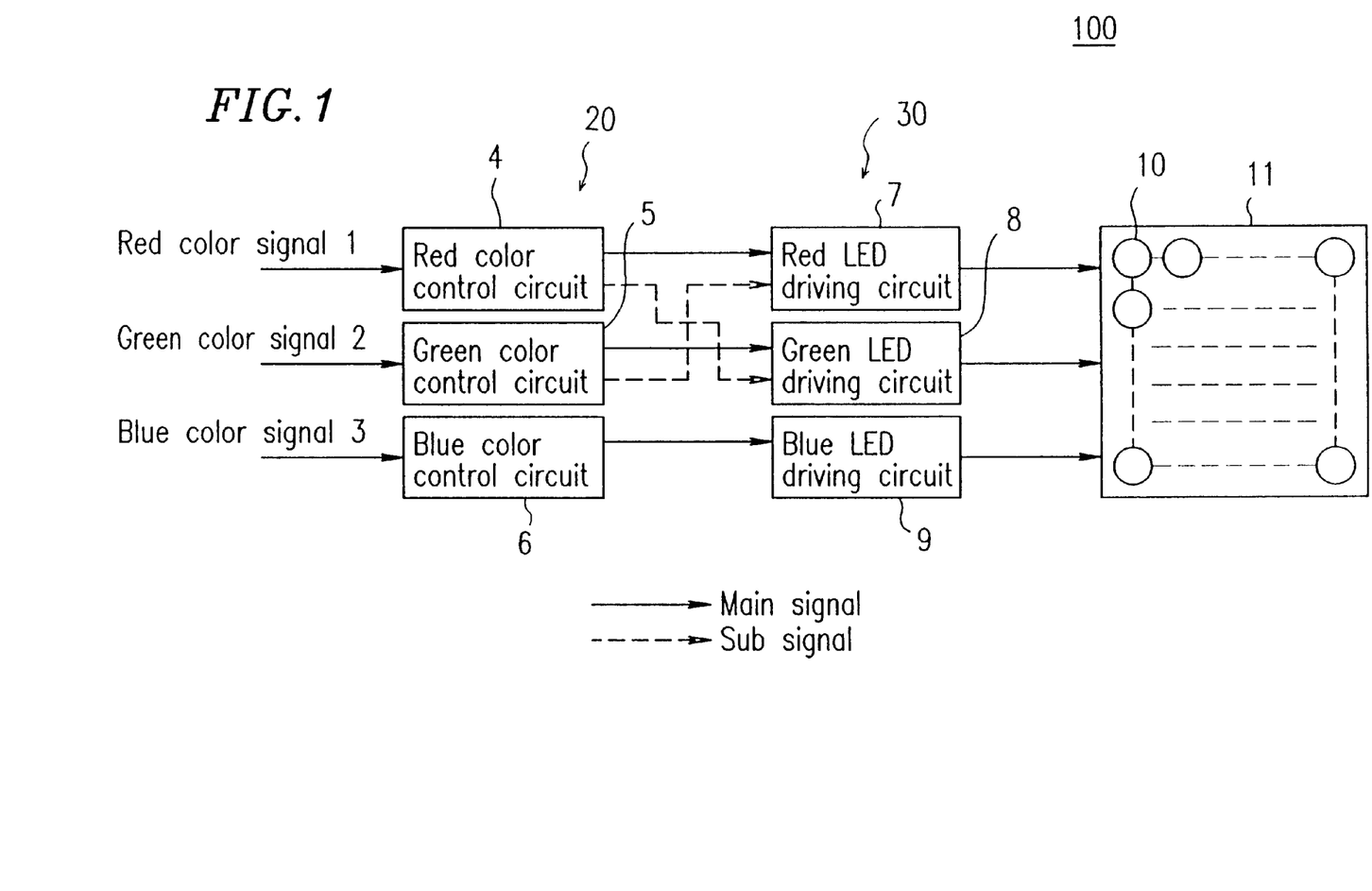
FIG. 1 is a block diagram of an LED display device in an example according to the present invention.

FIG. 1 is a block diagram illustrating a structure of an LED display device 100 in an example according to the present invention.

The LED display device 100 includes a color control section 20, an LED driving control section 30, and a display section 11 having a plurality of light emitting blocks or dots 10 arranged in a matrix. Each light emitting block includes at least a red LED, a green LED and a blue LED.

The color control section 20 includes a red color control circuit 4, a green color control circuit 5, a blue color control circuit 6. The red color control circuit 4 controls the amount ratio between red light emitted by a red LED and green light emitted by a green LED when a red color signal which instructs turning-on of only the red LED is input. The green color control circuit 5 controls the amount ratio between red light emitted by the red LED and green light emitted by the green LED when a green color signal which instructs turning-on of only the green LED is input.

The blue color control circuit 6 controls the amount of blue light emitted by a blue LED when a blue color signal which instructs turning-on of only the blue LED is input.

The LED driving control section 30 includes a red LED driving circuit 7, a green LED driving circuit 8 and a blue LED driving circuit 9.

The red LED driving circuit 7 controllably turns on the red LED by a signal obtained as a result of combination of an output from the red color control circuit 4 and an output from the green color control circuit 5.

The green LED driving circuit 8 controllably turns on the green LED by a signal obtained as a result of combination of an output from the green color control circuit 5 and an output from the red color control circuit 4.

The blue LED driving circuit 9 controllably turns on the blue LED by an output from the blue color control circuit 6.

When the red, green and blue LEDs are turned on to perform display, light having a color within the triangle made of three points (e.g., RL, GL and BL), representing LED chromaticity values, in FIG. 5 can be emitted.

The red color control circuit 4 is structured so as to output a main signal for turning on the red LED and a sub signal for turning on the green LED when a signal instructing turning-on of only the red LED is input for displaying an image on a color TV. The main signal causes the red LED driving circuit 7 to turn on the red LED, and the sub signal causes the green LED driving circuit 8 to turn on the green LED. In this manner, in response to a red color signal, both the red LED and the green LED are turned on at a ratio predetermined by the red color control circuit 4. Thus, light of a red color having a chromaticity value close to that of the red primary color provided by the TV broadcasting system can be emitted.

In the above-described operation for providing the red color, a yellow-green LED and a yellow-green LED driving circuit, a yellow LED and a yellow LED driving circuit, or an orange LED and an orange LED driving circuit can be used in lieu of the green LED and the green LED driving circuit 8.

The green color control circuit 5 is structured so as to output a main signal for turning on the green LED and a sub signal for turning on the red LED when a signal instructing turning-on of only the green LED is input for displaying an image on a color TV. The main signal causes the green LED driving circuit 8 to turn on the green LED, and the sub signal causes the red LED driving circuit 7 to turn on the red LED. In this manner, in response to a green color signal, both the green LED and the red LED are turned on at a ratio predetermined by the green color control circuit 5. Thus, light of a green color having a chromaticity value close to that of the green primary color provided by the TV broadcasting system can be emitted.

In the above-described operation for providing the green color, an orange LED and an orange LED driving circuit or a yellow LED and a yellow LED driving circuit can be used in lieu of the red LED and the red LED driving circuit 7.

As described above, red and green colors having proximate chromaticity values of the red and green primary colors provided by the TV broadcasting system are generated by turning on appropriate LEDs among the red, orange, yellow, yellow-green and green LEDs.

Figure 2A:
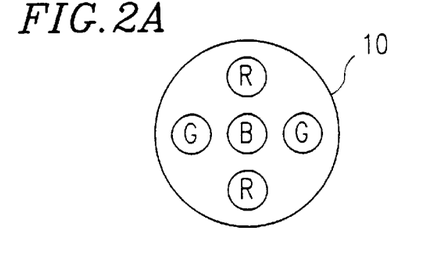
FIGS. 2A and 2B show exemplary arrangements of LEDs in a light emitting block in the LED display device shown in FIG. 1.
Figure 2B:
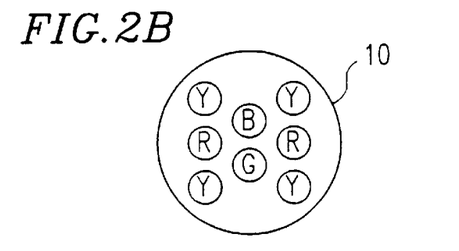

FIGS. 2A and 2B show exemplary arrangements of LEDs in each light emitting block. FIG. 2A shows an arrangement of red, green and blue LEDs, and FIG. 2B shows an arrangement of red, green, blue and yellow LEDs. In FIGS. 2A and 2B, letter R represents a red LED, letter G represents a green LED, letter B represents a blue LED, and letter Y represents a yellow LED.

Figure 3:
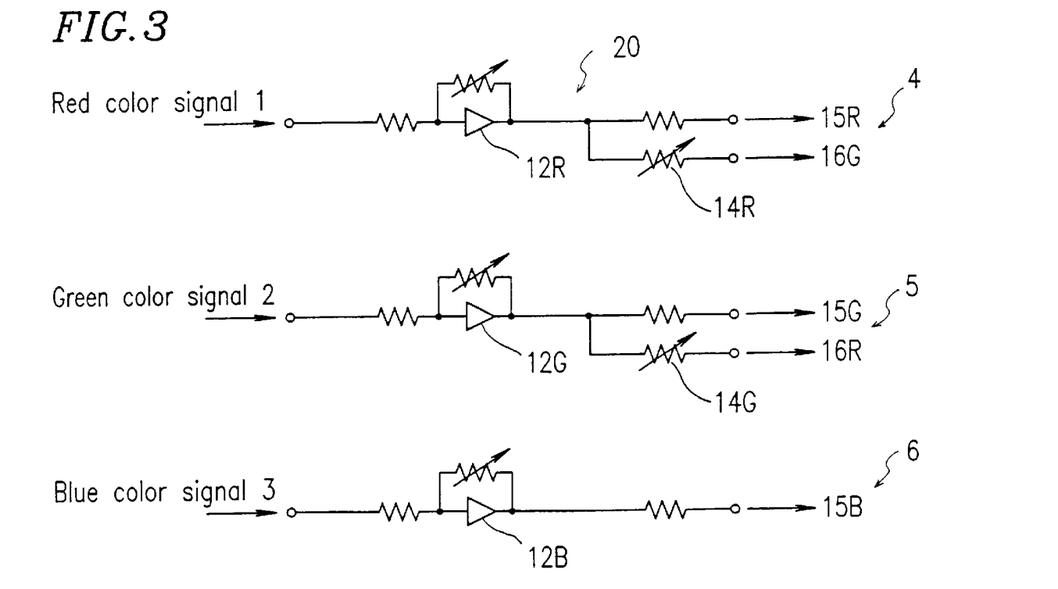
FIG. 3 is an exemplary circuit diagram of a color control section in the LED display device shown in FIG. 1.
Figure 4:
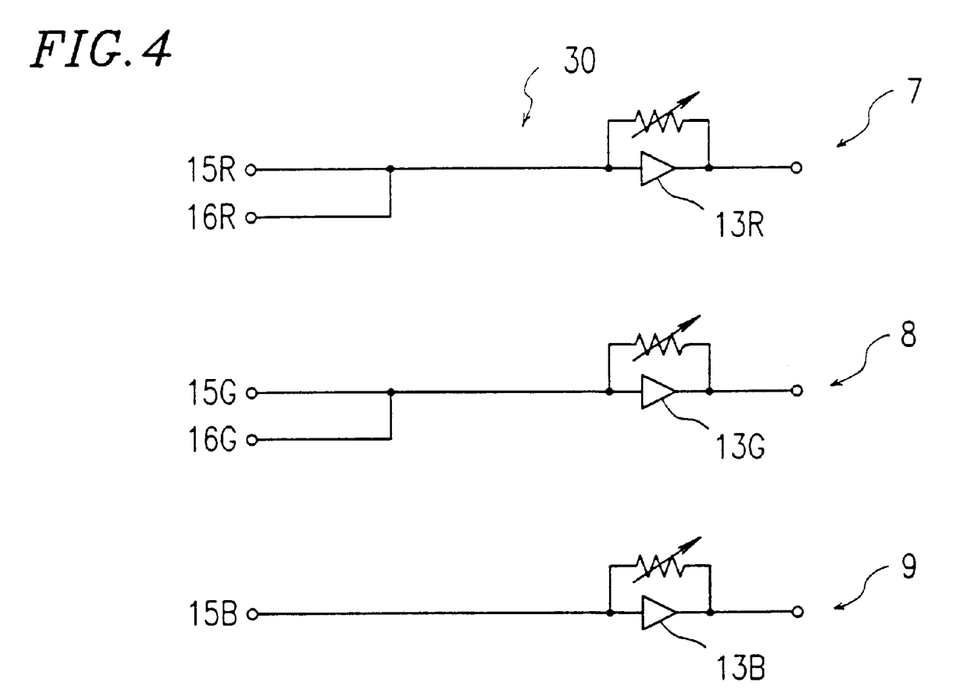
FIG. 4 is an exemplary circuit diagram of an LED driving control section in the LED display device shown in FIG. 1.

FIG. 3 shows an exemplary configuration of the color control section 20 including the red, green and blue color control circuits 4, 5 and 6 shown in FIG. 1. FIG. 4 shows an exemplary configuration of the LED driving control section 30 including the red, green and blue LED driving circuits 7, 8 and 9 shown in FIG. 1.

With reference to FIG. 3, the red color signal 1 is first amplified by an amplifier 12R to a required level and then divided into a main signal for turning on the red LED and a sub signal for turning on the green LED by a signal division element. The main signal is sent to the red LED driving circuit 7 via a terminal 15R, and the sub signal is sent to the green LED driving circuit 8 via a terminal 16G. Similarly, the green color signal 2 is first amplified by an amplifier 12G to a required level and then divided into a main signal for turning on the green LED and a sub signal for turning on the red LED. The main signal is sent to the green LED driving circuit 8 via a terminal 15G, and the sub signal is sent to the red LED driving circuit 7 via a terminal 16R. The blue color signal 3 is first amplified by an amplifier 12B to a required level and then sent to the blue LED driving circuit 9 via a terminal 15B. The ratio between the main signal and the sub signal is adjusted using variable resistors 14R and 14G acting as chromaticity adjusting elements.

In this example, both the red color control circuit and the green color control circuit are provided. A practical effect is obtained by even only one of the two circuits.

With reference to FIG. 4, the main signal for turning on the red LED input via the terminal 15R and the sub signal for turning on the red LED input via the terminal 16R are combined together, amplified by an amplifier 13R, and then output to the LED display section 11 as a signal for turning on the red LED. The main signal for turning on the green LED input via the terminal 15G and the sub signal for turning on the green LED input via the terminal 16G are combined together, amplified by an amplifier 13G, and then output to the LED display section 11 as a signal for turning on the green LED. The signal for turning on the blue LED input via the terminal 15B is amplified by an amplifier by 13B and then output to the LED display section 11 as a signal for turning on the blue LED.

FIG. 5 is a chromaticity diagram (CIE 1931 standard chromaticity diagram) illustrating exemplary chromaticity values.

Points RL, GL and BL represent exemplary color coordinates of the red, green and blue LEDs. The chromaticity coordinates of RL are x=0.72 and y=0.28; the chromaticity coordinates of GL are x=0.17 and y=0.70; and the chromaticity coordinates of BL are x=0.13 and y=0.075. When color video display is performed using the red, green and blue LEDs, the colors within the triangle made of points RL, GL and BL can be displayed.

Point RL1 (x=0.70, y=0.30) represents another exemplary color coordinates of the red LED. Point GL1 (x=0.20, y=0.71) and point GL2 (x=0.14, y=0.65) represent alternative exemplary color coordinates of the green LED.

Points OL1 and OL2 are exemplary color coordinates of the orange LED. Points YL1 and YL2 are exemplary color coordinates of the yellow LED. Point YGL1 is an exemplary color coordinate of the yellow-green LED.

Points RH, GH and BH represent red, green and blue color coordinates of the HDTV studio standards. The NTSC standards (SMPTE 170M) have substantially equal color coordinates.

Chromaticity coordinates of a red color obtained by simultaneously turning on the red and green LEDs having the chromaticity coordinates at RL and GL are on a straight line connecting RL and GL. As a result of adjusting the red color control circuit 4 (FIG. 1), light having the chromaticity coordinates of x=0.65 and y=0.33, which are represented by RR and proximate to RH, can be emitted. At this point, the luminance (brightness) ratio between the red LED and the green LED is preferably set to be about 100:35. The luminance of the resultant light is 135, which is the sum of the luminance of the red light and the green light and is higher than that of the red light obtained by turning on only the red LED.

Chromaticity coordinates of a green color obtained by simultaneously turning on the red and green LEDs having the chromaticity coordinates at GL and RL are on a straight line connecting GL and RL. As a result of adjusting the green color control circuit 5 (FIG. 1), light having the chromaticity coordinates of x=0.30 and y=0.60, which are equal to GH, can be emitted. At this point, the luminance ratio between the green LED and the red LED is preferably set to be about 100:12.5. The luminance of the resultant light is 112.5, which is the sum of the luminance of the green light and the red light and is higher than that of the green light obtained by turning on only the green LED.

Alternatively, a green LED having chromaticity coordinates GL1 (x=0.20, y=0.71) and the red LED having the chromaticity coordinates RL can be used together. As a result of adjusting the green color control circuit 5 (FIG. 1), light having the chromaticity coordinates of x=0.30 and y=0.63, which are represented by GG1 and proximate to GH, can be emitted. At this point, the luminance ratio between the green LED and the red LED is preferably set to be about 100:9.

Still alternatively, a green LED having chromaticity coordinates GL2 (x=0.14, y=0.65) and the red LED having the color coordinate RL can be used together. As a result of adjusting the green color control circuit 5 (FIG. 1), light having the chromaticity coordinates of x=0.28 and y=0.56, which are represented by GG2 and proximate to GH, can be emitted. At this point, the luminance ratio between the green LED and the red LED is preferably set to be about 100:14.

In this example, the red LED having the chromaticity coordinates of RL is used for simplicity. The same effect can be obtained when a red LED having another chromaticity coordinates, for example, x=0.70 and y=0.30 is used.

According to the present invention, red primary color light is emitted by turning on the red LED by a main signal and turning on the green LED by a sub signal, and green primary color light is emitted by turning on the green LED by a main signal and turning on the red LED by a sub signal. In this manner, natural color display having a satisfactory reproducibility is realized.

The brightness of the red primary color light and the green primary color light obtained according to the present invention is also raised compared to the brightness of the red color light and the green color light obtained by turning on only the red LED and the green LED, respectively.

As described above, according to the present invention, red primary color light and green primary color light having colors very close to the red primary color and the green primary color provided the TV broadcasting system are emitted by the LED display device. The reproducibility of red and green colors is improved, and natural and well-balanced color display is realized.

The intensity of light emitted by each LED can be adjusted by appropriately setting the amplification factor and/or the amount ratio of light to be combined, using the amplifier and/or the variable resistor.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An LED display device, comprising:
   an LED display section including a plurality of light emitting blocks arranged in a matrix, each light emitting block including at least a red LED, a green LED, and a blue LED;
   a color control section including a red color control circuit, a green color control circuit and a blue color control circuit, for controlling an amount of light emitted by the red LED, the green LED, and the blue LED in accordance with a red color signal, a green color signal and a blue color signal; and
   an LED driving control section including a red LED driving circuit, a green LED driving circuit and a blue LED driving circuit, for controlling the LED display section in response to an output signal from the color control section,
   wherein at least one of:
   (a) a control of controlling the red LED driving circuit and the green LED driving circuit in response to an output signal from the red color control circuit, and
   (b) a control of controlling the green LED driving circuit and the red LED driving circuit in response to an output signal from the green color control circuit is performed.

2. An LED display device according to claim 1, wherein the color control section includes at least one chromaticity adjusting element for adjusting chromaticity coordinates of a color signal to be sent to the LED driving control section.

3. An LED display device according to claim 1, wherein the red color control circuit and the green color control circuit respectively include amplification elements for amplifying color signals to be sent to the LED driving control section at different ratios and also include a signal division element for supplying the amplified signals to the LED driving control section.

4. An LED display device, comprising:
   an LED display section including a plurality of light emitting blocks arranged in a matrix, each light emitting block including at least a red LED, a green LED, and a blue LED;
   a red color control circuit, a green color control circuit, a blue color control circuit for controlling amounts of light emitted by the red LED, the green LED, and the blue LED in accordance with a red color signal, a green color signal, and a blue color signal; and
   a red LED driving circuit, a green LED driving circuit, and a blue LED driving circuit in response to output signals from the red color control circuit, the green color control circuit, and the blue color control circuit,
   wherein at least one of:
   (a) a control of controlling the red LED driving circuit and the green LED driving circuit in response to an output signal from the red color control circuit, and
   (b) a control of controlling the green LED driving circuit and the red LED driving circuit in response to an output signal from the green color control circuit is performed, and at least one of an orange LED, a yellow LED and a yellow-green LED is controlled.

5. An LED display device according to claim 4, wherein the color control section includes at least one chromaticity adjusting element for adjusting a chromaticity coordinate of a color signal to be sent to the LED driving control section.

6. An LED display device according to claim 4, wherein the red color control circuit and the green color control circuit respectively include amplification elements for amplifying color signals to be sent to the LED driving control section at different ratios and also include a signal division element for supplying the amplified signals to the LED driving control section.

7. A method for controlling an LED display device including a light emitting block having at least a red LED, a green LED and a blue LED, the method comprising the step of turning on the red LED and at least one of the other LEDs having a different chromaticity value to adjust the chromaticity value of the red LED.

8. A method according to claim 7, wherein the at least one of the other LEDs is the green LED.

9. A method according to claim 7, wherein at least one of the other LEDs is at least one selected from the group consisting of an orange LED, a yellow LED and a yellow-green LED.

10. A method for controlling an LED display device including a light emitting block having at least a red LED, a green LED and a blue LED, the method comprising the step of turning on the green LED and at least one of the other LEDs having a different chromaticity value to adjust the chromaticity value of the green LED.

11. A method according to claim 10, wherein the at least one of the other LEDs is the red LED.

12. A method according to claim 10, wherein at least one of the other LEDs is at least one selected from the group consisting of an orange LED, a yellow LED and a yellow-green LED.

13. An LED display device, comprising:

an LED display section including a plurality of light emitting blocks arranged in a matrix, each light emitting block including at least a red LED, a green LED, and a blue LED;

a color control section including a red color control circuit, a green color control circuit and a blue color control circuit, for controlling an amount of light emitted by the red LEDs, the green LEDs, and the blue LEDs in accordance with a red color signal, a green color signal and a blue color signal; and an LED driving control section including:
  (a) a red LED driving circuit responsive to at least one of:
    (1) an output signal from the red color control circuit, and
    (2) an output signal from the green color control circuit, and
  (b) a green LED driving circuit responsive to at least one of
    (1) an output signal from the red color control circuit, and
    (2) an output signal from the green color control circuit, and
  (c) a blue LED driving circuit responsive to an output signal from the blue color control circuit, for controlling the LED display section.

\* \* \* \* \*

UNITED STATES PATENT AND TRADEMARK OFFICE
CERTIFICATE OF CORRECTION

PATENT NO. : 6,144,352
DATED : November 7, 2000
INVENTOR(S) : Matsuda et al.

It is certified that error appears in the above-identified patent and that said Letters Patent is hereby corrected as shown below:

Title page,
Item [56] References Cited, Foreign Patent Documents, insert -- WO 88/02533 4/1998 WIPO --.

Signed and Sealed this

Thirtieth Day of October, 2001

Attest:

NICHOLAS P. GODICI
*Attesting Officer*  *Acting Director of the United States Patent and Trademark Office*